(12) United States Patent
Courbis (10) Patent No.: US 11,933,448 B2
(45) Date of Patent: Mar. 19, 2024

(54) SYSTEM FOR PROTECTING THE MOUTH OF A PIPE AND METHOD FOR IMPLEMENTING SUCH A SYSTEM

(71) Applicant: Financiere de Beaumont—FBD, Romans-sur-Isère (FR)

(72) Inventor: Hervé Courbis, Beaumont Monteux (FR)

(73) Assignee: Financiere de Beaumont—FBD, Romans-sur-Isère (FR)

( * ) Notice: Subject to any disclaimer, the term of this patent is extended or adjusted under 35 U.S.C. 154(b) by 94 days.

(21) Appl. No.: 17/783,006

(22) PCT Filed: Dec. 9, 2020

(86) PCT No.: PCT/FR2020/052357
§ 371 (c)(1),
(2) Date: Jun. 7, 2022

(87) PCT Pub. No.: WO2021/148730
PCT Pub. Date: Jul. 29, 2021

(65) Prior Publication Data
US 2023/0021441 A1 Jan. 26, 2023

(30) Foreign Application Priority Data
Jan. 24, 2020 (FR) ...................................... 2000680

(51) Int. Cl.
*F16L 57/00* (2006.01)
(52) U.S. Cl.
CPC .................................. *F16L 57/005* (2013.01)
(58) Field of Classification Search
CPC ............................... F16L 57/005; B65D 59/00

USPC ............................................... 138/96 R, 96 T
See application file for complete search history.

(56) References Cited

U.S. PATENT DOCUMENTS

| 1,498,563 A | * | 6/1924 | Morrison | ............... E21B 17/006 |
| | | | | 138/96 R |
| 1,762,248 A | * | 6/1930 | Shrum | .................... B65D 59/06 |
| | | | | 138/96 R |
| 1,903,220 A | * | 3/1933 | Lemert | .................. B65D 59/00 |
| | | | | 138/96 R |
| 2,061,366 A | * | 11/1936 | Mazurie | ................ F16L 57/005 |
| | | | | 102/528 |
| 2,708,453 A | * | 5/1955 | Das | ........................ B65D 59/00 |
| | | | | 24/20 R |

(Continued)

FOREIGN PATENT DOCUMENTS

WO  WO 2019/059806  3/2019

OTHER PUBLICATIONS

International Search Report and the Written Opinion dated Feb. 18, 2021 From the International Searching Authority Re. Application No. PCT/FR2020/052357 and Its Translation of Search Report Into English. (12 Pages).

*Primary Examiner* — Patrick F Brinson (57) ABSTRACT

System (1) for protecting the mouth (4) of a pipe (2), the system (1) comprising a protective part (10) that has a central portion (20) provided with at least one opening (22) for the passage of a fluid circulating in the pipe (2), and a peripheral portion (30) provided with skirts (31, 32, 33, 34) provided to protect surfaces (63, 64) of the mouth (4) from the fluid, the protective part (10) being made of a deformable material, so as to be able to be removed through the interior of the pipe (2).

9 Claims, 6 Drawing Sheets

(56) References Cited

U.S. PATENT DOCUMENTS

| | | | |
|---|---|---|---|
| 2,977,993 A | | 4/1961 | Scherer |
| 3,080,993 A | | 3/1963 | Livingstone |
| 3,744,528 A | * | 7/1973 | Vestal ................. F16L 55/1286 220/802 |
| 3,911,960 A | * | 10/1975 | Flimon ................. F16L 57/005 220/640 |
| 4,081,879 A | | 4/1978 | Rubright |
| 4,342,337 A | * | 8/1982 | Underwood .......... F16L 57/005 138/96 T |
| 4,777,985 A | * | 10/1988 | Arduini .................. B65D 59/08 138/96 R |
| 5,004,016 A | | 4/1991 | Kliewer |
| 5,337,792 A | * | 8/1994 | Tempel .................. B65D 59/02 138/89.4 |
| 5,383,494 A | * | 1/1995 | Caine ..................... F16L 35/00 285/903 |
| 5,899,235 A | * | 5/1999 | Thorpe .................. F16L 33/22 29/890.144 |
| 6,796,333 B2 | * | 9/2004 | Birkel .................... B65D 85/66 138/109 |
| 2012/0049425 A1 | | 3/2012 | Willis |
| 2018/0023749 A1 | * | 1/2018 | Ludwig ................. B65D 59/06 138/96 T |

\* cited by examiner

SYSTEM FOR PROTECTING THE MOUTH OF A PIPE AND METHOD FOR IMPLEMENTING SUCH A SYSTEM

RELATED APPLICATIONS

This application is a National Phase of PCT Patent Application No. PCT/FR2020/052357 having International filing date of Dec. 9, 2020, which claims the benefit of priority of France Patent Application No. FR2000680 filed on Jan. 24, 2020. The contents of the above applications are all incorporated by reference as if fully set forth herein in their entirety.

FIELD AND BACKGROUND OF THE INVENTION

The present invention relates to a system for protecting the mouth of a pipe, in particular of the "I-Tube" type for oil exploitation. The invention also concerns an implementation method for the such a system.

Various systems are known for protecting pipes from solid matter or fluids during their transport or storage.

U.S. Pat. No. 2,977,993A describes an example of a protection system consisting of a cover that is made of a plastic material, in particular elastomer, intended to be arranged at the end of a pipe in order to protect its interior. The cover comprises a closed, dome-shaped central portion for preventing any dust, water or other foreign matter from entering into the pipe.

U.S. Pat. No. 5,004,016 describes another example of a protection system consisting of a part that is made of an elastomer material, intended to be arranged at the end of a tube in order to protect its thread. The part comprises a skirt intended to cover the threaded external surface of the tube. The part is provided with a catch so that it can be removed from the exterior. The catch is disposed in a central orifice allowing the passage of fluid through the part.

SUMMARY OF THE INVENTION

The aim of the present invention is to propose a protection system for pipes that are intended to be submerged, in particular for oil exploitation by a floating production, storage and offloading unit (FPSO: "Floating Production Storage and Offloading"), a tension-leg platform (TLP: "Tension-leg platform"), or a floating complex for liquefied natural gas (FLNG: "Floating Liquefied Natural Gas").

For this purpose, the invention relates to a system for protecting the mouth of a pipe, the system comprising a protective part that has a central portion provided with at least one opening for the passage of a fluid circulating in the pipe, and a peripheral portion provided with skirts provided to protect surfaces of the mouth from the fluid, the protective part being made of a deformable material so as to be able to be removed from the interior of the pipe.

Thus, the invention makes it possible to protect the mouth of the pipe from fluid and foreign matter (sea water and marine organisms, e.g., algae, shellfish, etc.), while providing the possibility of selectively removing the protective part from the exterior or interior of the pipe.

The protective part is designed to withstand the transportation of the pipe, for example connected to an FPSO unit, capable of being towed at sea between two continents.

At the same time, the protective part is designed to allow non-manual removal, i.e., by mechanised means.

This removal may be performed from the exterior by using a remote-operated underwater vehicle (ROV: "Remoted Operated Underwater Vehicle") under several metres of water, with a low tensile strength. However, such an operation is both costly and complex. In view of the fatal risks, its removal from the exterior by any diver is totally prohibited.

Particularly advantageously, removal may be performed from the interior of the pipe, from a floating unit, a platform or a boat, by means of a winch pulling on a line or strap fixed to the protective part. The latter then deforms and folds back on itself, so it can move up along the pipe. This method of removal is much simpler and less expensive than the intervention of a submarine robot.

According to other advantageous characteristics of the invention, taken individually or in combination:

- The protective part comprises thinned areas in order to facilitate deformation and removal.
- The thinned areas are formed on the peripheral portion.
- The thinned areas comprise lines that are distributed in axial planes on the peripheral portion.
- The thinned areas comprise at least some of the junction angles that are between the skirts of the peripheral portion.
- The thinned areas are formed on the central portion.
- The thinned areas comprise thinned sections that are formed on the radii of the central portion.
- The central portion is wheel-shaped, with at least two radii that are connected to the peripheral portion and separated by openings for the passage of fluid.
- The radii have a cylindrical cross-section.
- The radii are inclined relative to a radial plane of the protective part.
- The peripheral portion is provided with at least three skirts in order to protect, respectively, an internal surface, a front surface and an external surface of the mouth of the pipe.
- The peripheral portion is provided with four skirts in order to protect, respectively, an interior surface, a front surface, an exterior surface and a rear surface of the mouth of the pipe.
- The system comprises attaching means designed to attach tensile means to the protective part, so that it may be removed.
- The attaching means are designed to attach tensile means to the protective part from above and below, so that it may be removed selectively from the interior or exterior of the pipe.
- The attaching means comprise an anchoring piece fixed to the hub of the central portion.
- The anchoring piece is made of a harder material than the protective part.
- The attaching means comprise an anchoring member that is secured to the hub of the central portion.
- The attaching means comprise the hub of the central portion, directly receiving the tensile means
- The attaching means comprise elements that are arranged on the peripheral portion of the protective part and designed to receive the tensile means.
- The protective part should be made of a polyurethane material, preferably Courbhane (registered trademark).
- The anchoring piece should be made of a polyurethane material, preferably Courbhane (registered trademark), harder than the material that the protective part is made of.

The invention also provides a method for implementing a protection system as mentioned above, the method comprising a step for assembling the protective part onto the mouth of the pipe, and a step for removing the protective part selectively from the interior or exterior of the pipe.

During the assembly step, the protective part is force-fitted onto the mouth of the pipe. This operation does not require tools to be in contact with the mouthpiece that is to be protected.

During the removal step, the protective part is pulled and deformed in order to remove it from the mouth of the pipe. For it to be removed from the interior, the part is folded back on itself, such that its external diameter (or its largest external dimension) becomes smaller than the internal diameter of the pipe.

BRIEF DESCRIPTION OF THE SEVERAL VIEWS OF THE DRAWINGS

The invention will be better understood from the following description which is given solely by way of non-limiting example and is made with reference to the appended drawings, wherein.

DESCRIPTION OF SPECIFIC EMBODIMENTS OF THE INVENTION

FIGS. 1 to 8 show a system (1) for protecting the mouth (4) of pipe (2).

In the example of the figures, the pipe (2) is of the "I-Tube" type, designed to equip a FPSO floating unit, a TLP platform or a FLNG complex. The pipe (2) comprises a tubular body (3) and a mouth (4) provided with a frusto-conical portion (5) and an annular collar (6). By way of indication, an FPSO unit may comprise twenty-four pipes (2) of this type that are to be protected.

The collar (6) forms a flange for fixing the pipe (2) to another pipe, for example, a "bend stiffener" of a flexible or umbilical conduit.

The collar (6) comprises four surfaces (61, 62, 63, 64) that are to be protected by the system (1), namely an internal cylindrical surface (61), a front annular surface (62), an external cylindrical surface (63) and a rear annular surface (64). The collar (6) has a plurality of through bores (65) provided between the front surface (62) and the rear surface (64).

Figure 1:
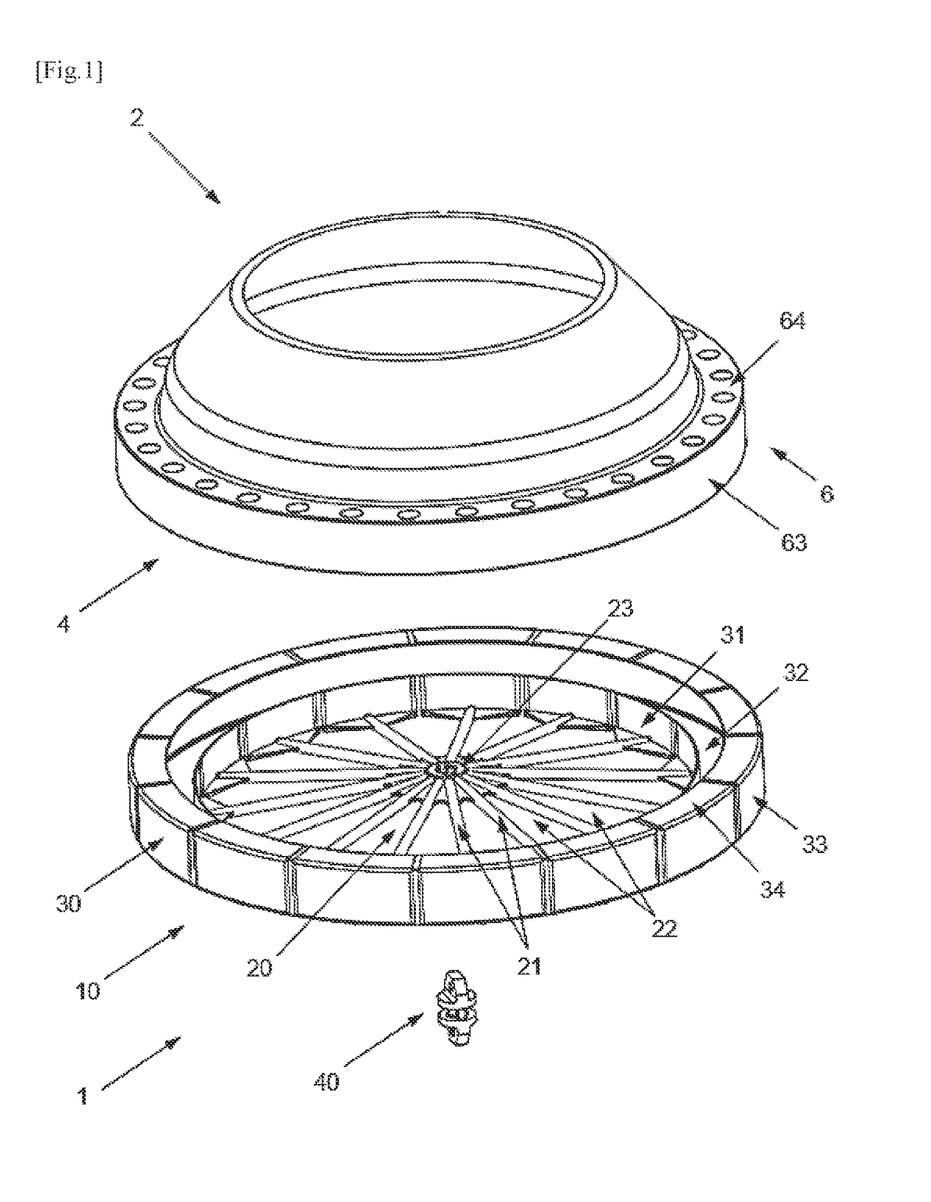
FIG. 1 is an exploded perspective view of a system for protecting a pipe mouth, showing said pipe mouth, and the system consisting of two parts, namely a protective part and an attachment part.
Figure 2:
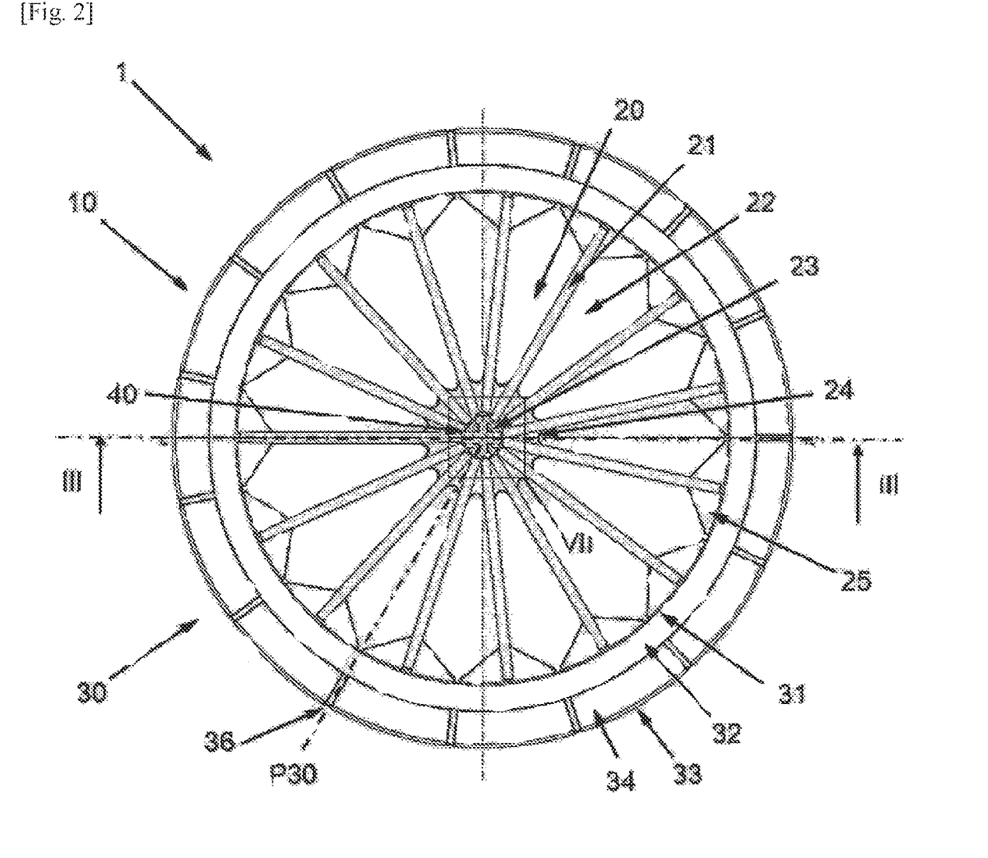
FIG. 2 is an axial view of the system without the pipe.
Figure 3:
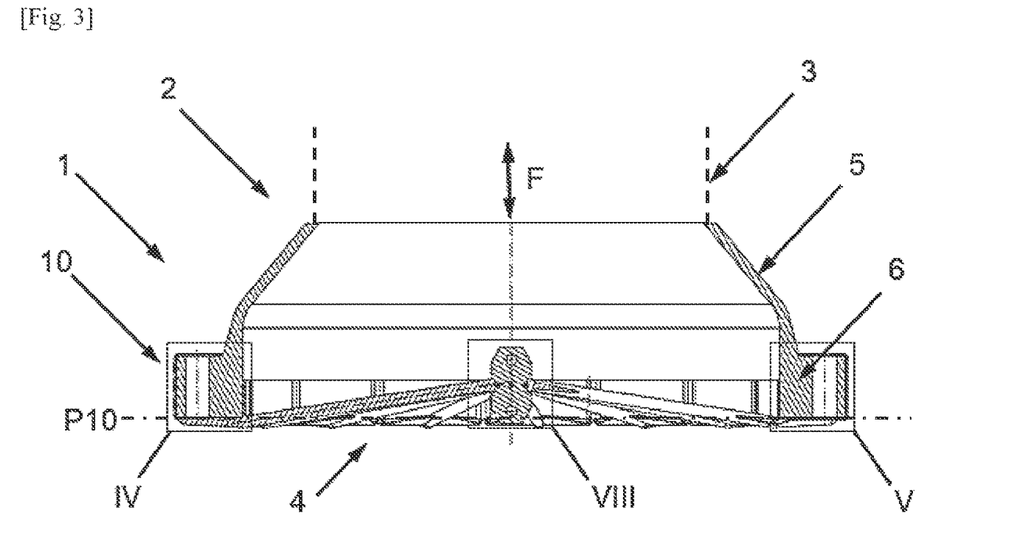
FIG. 3 is a transverse cross-sectional view of the pipe along the line III-Ill in FIG. 2.
Figure 4:
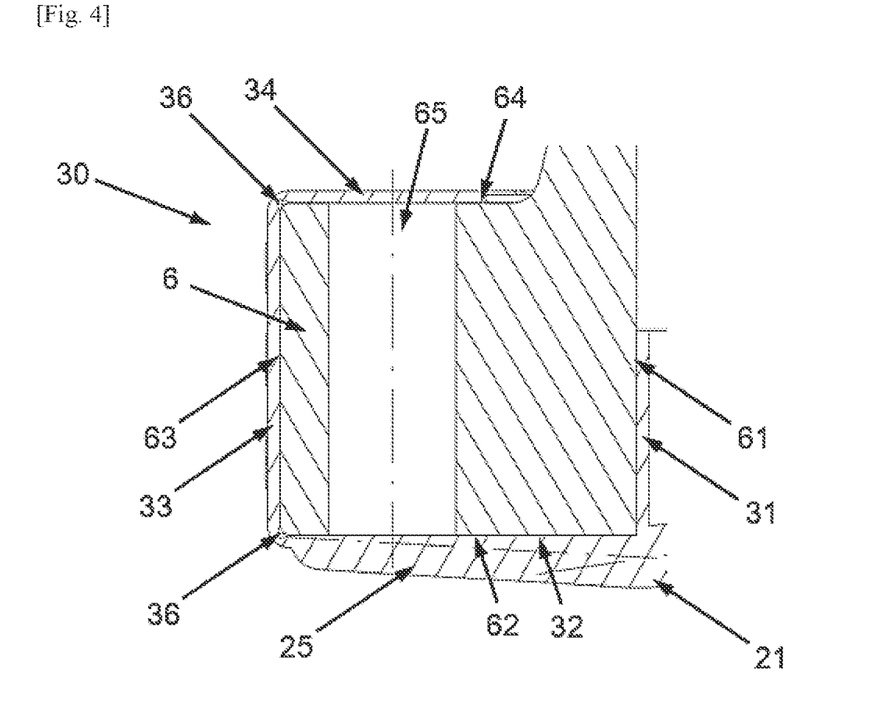
FIG. 4 is an enlarged view of detail IV in FIG. 3, showing a first side of the protective part.
Figure 5:
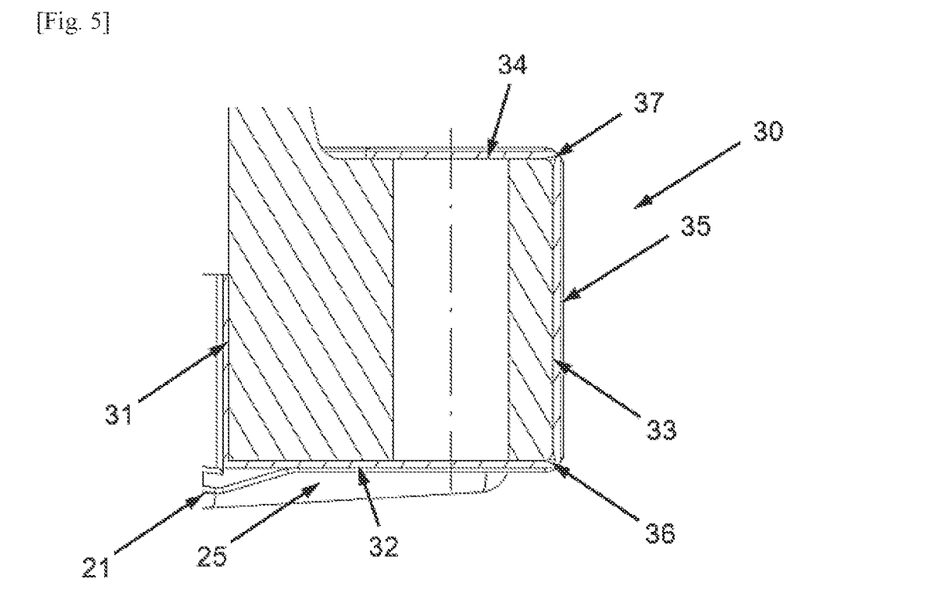
FIG. 5 is an enlarged view of detail V in FIG. 3, showing a second side of the protective part.
Figure 6:
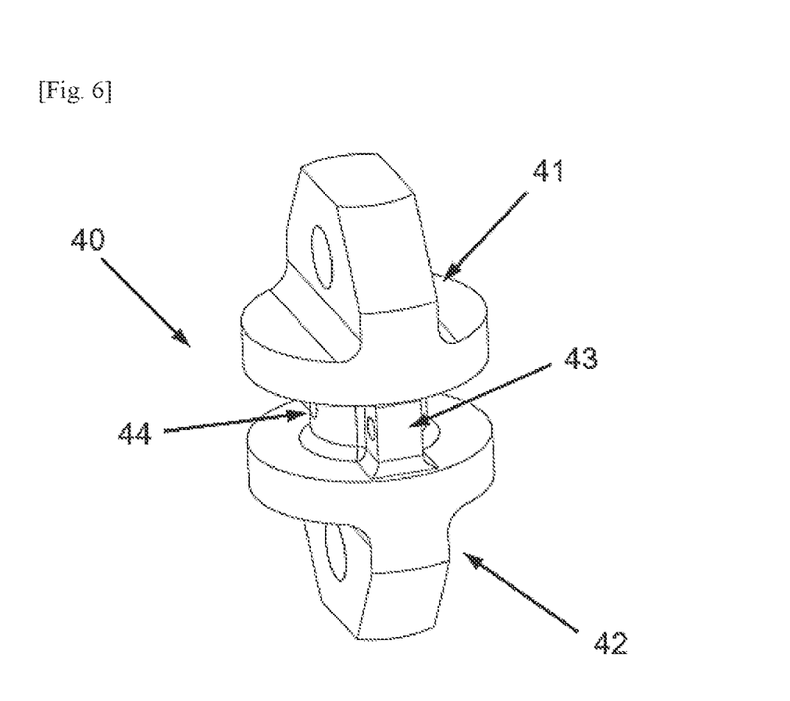
FIG. 6 is a perspective view of the attachment part.
Figure 7:
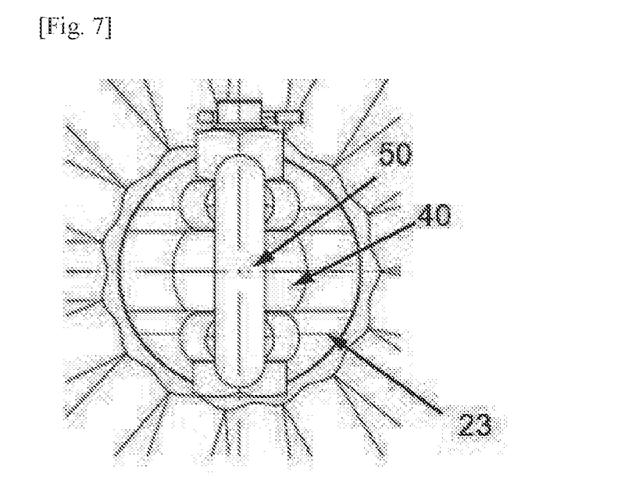
FIG. 7 is an enlarged view of detail VII in FIG. 2, showing the attachment part.
Figure 8:
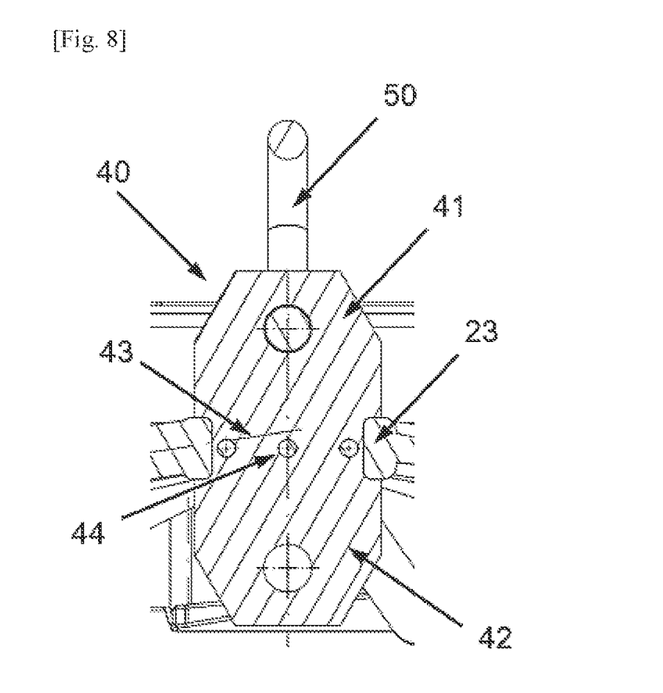
FIG. 8 is an enlarged view of detail VIII in FIG. 3, showing the attachment part.

A fluid (F) circulating in the pipe (2) is represented by a double arrow in FIG. 3. The fluid (F) is, for example, seawater, circulating freely in one direction or the other direction whereas the mouth (4) of the pipe (2) is immersed, during its transportation or at the site of exploitation.

System (1) comprises a protective part (10) and an anchoring piece (40). The protective part (10) comprises a central portion (20) and a peripheral portion (30).

The central portion (20) is wheel-shaped. The central portion (20) comprises a set of radii (21), openings (22) provided between the radii (21), and a central hub (23). The openings (22) make it possible for the fluid (F) to pass through the system (1).

Clearly, in order not to hinder the passage of the fluid (F) through the system (1), the central portion (20) does not comprise any additional element, such as a membrane closing off the openings (22). The openings (22) of the central portion (20) represent a total area corresponding to at least 30% of the cross-section of the pipe (2), and preferably more than 50%.

The radii (21) extend between the hub (23) and the peripheral portion (30). The radii (21) have a cylindrical cross-section, minimising the hydrodynamic resistance to the fluid (F), relative to a flat cross-section. The radii (21) are inclined relative to a radial plane (P10) of the part (10), minimising the hydrodynamic resistance to the fluid (F), relative to radii (21) which would all be arranged in the same radial plane (P10).

The central portion (20) has a collar of stiffening ribs (24) that are arranged between the radii (21) that are located all around the hub (23). The central portion (20) also comprises a series of stiffening elements (25) that are arranged on either side of the radii (21) and against the peripheral portion (30). These stiffening means (24, 25) make it possible to ensure that the protective part (10) does not fail during its removal.

The peripheral portion (30) comprises four skirts (31, 32, 33, 34) in order to protect four surfaces (61, 62, 63, 64) of the mouth (4) from the fluid (F) and foreign matter. More precisely, the peripheral portion (30) comprises a cylindrical internal skirt (31), a front annular skirt (32), an external cylindrical skirt (33) and a rear annular skirt (34) respectively protecting the internal cylindrical surface (61), the front annular surface (62), the external cylindrical surface (63) and the rear annular surface (64) of the mouth (4) of the pipe (2). In practice, the geometry of the peripheral portion (30) is adapted to the geometry of the collar (6). The skirts (31-34) cover the surfaces (61-64), preferably by means of being pressed against the surfaces (61-64).

The protective part (10) is made of a deformable material so as to be intended to be removed from the interior of the pipe (2). The folded part (10) has an external diameter which is smaller than the internal diameter of the pipe (2). The part (10) has elastomeric behaviour, with the ability to deform for removal, and return to its initial shape and dimensions after removal.

Preferably, the protective part (10) should be made of a Courbhane polyurethane material (registered trademark).

Advantageously, the protective part (10) may comprise thinned areas in order to facilitate its deformation, its folding and its removal. The thinned areas may be formed on the peripheral portion (30) and/or on the central portion (20). In the example of the figures, the thinned areas comprise lines (35) that are distributed in axial planes (P30) on the peripheral portion (30), as well as the junction angles (36) between the skirts (32, 33) and the function angles (37) between the skirts (33, 34). In a variant that is not shown, the thinned areas may comprise thinned sections formed on the radii (21) of the central section (20).

The anchoring piece (40) consists of attaching means for attaching tensile means to the part (10), so that it may be removed. The anchoring piece (40) is secured to the hub (23), for example, by overmoulding. In the example of the figures, the anchoring piece (40) comprises an upper portion (41) provided with an upper fixing orifice, a lower portion (42) provided with a lower fixing orifice, and an intermediate portion (43) that is thinner than the portions (41, 42) and provided with several orifices (44) for receiving the material of the hub (23).

The tensile means may comprise a metal catch (50) fixed to the upper portion (41) of the anchoring piece (40), and a line or strap fixed to the catch (50) and rising from the interior of the pipe (2), in order to remove the protective part (10) from the interior. If required, a catch (50) and a line may be attached to the lower portion (42) of the anchor piece (40), in order to remove the protective part (10) from the exterior.

The anchoring piece (40) may be made of a harder material than the protective part (10), in order to better withstand the tensile forces. Preferably, the anchoring piece (40) should be made of a polyurethane material that is harder than the protective part (10). Even more preferably, the anchoring piece (40) may be made of a Courbhane polyurethane material (registered trademark).

Figure 9:
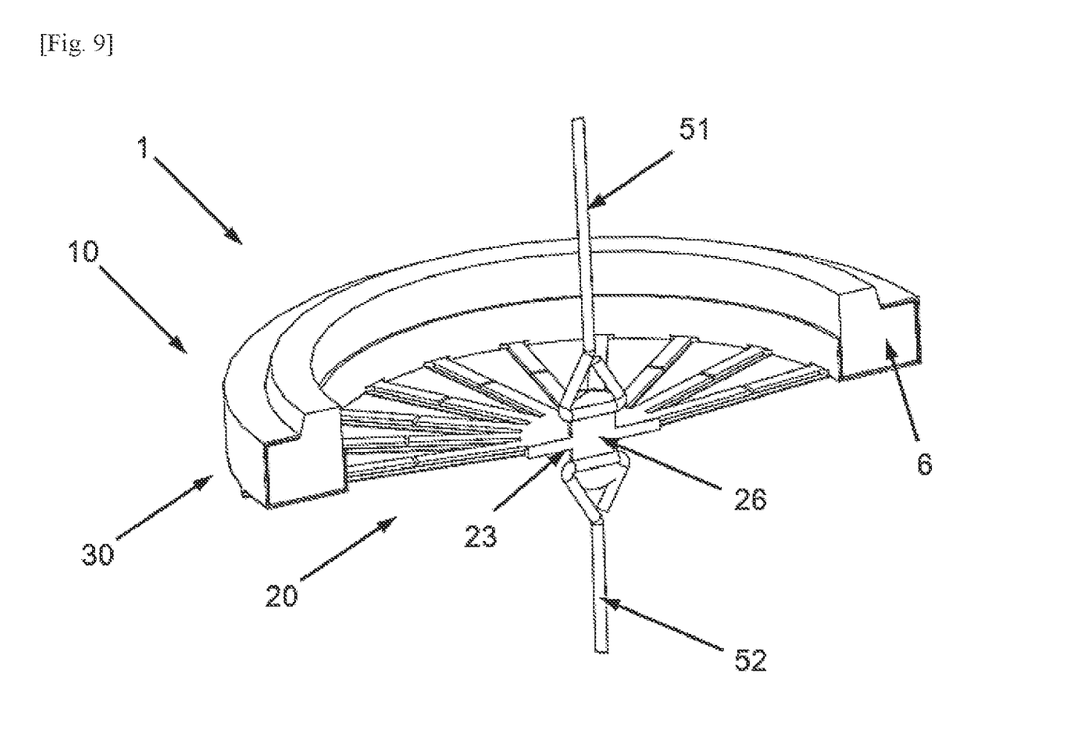
FIG. 9 is a perspective and cross-sectional view of a protection system in accordance with a second embodiment of the invention.
Figure 10:
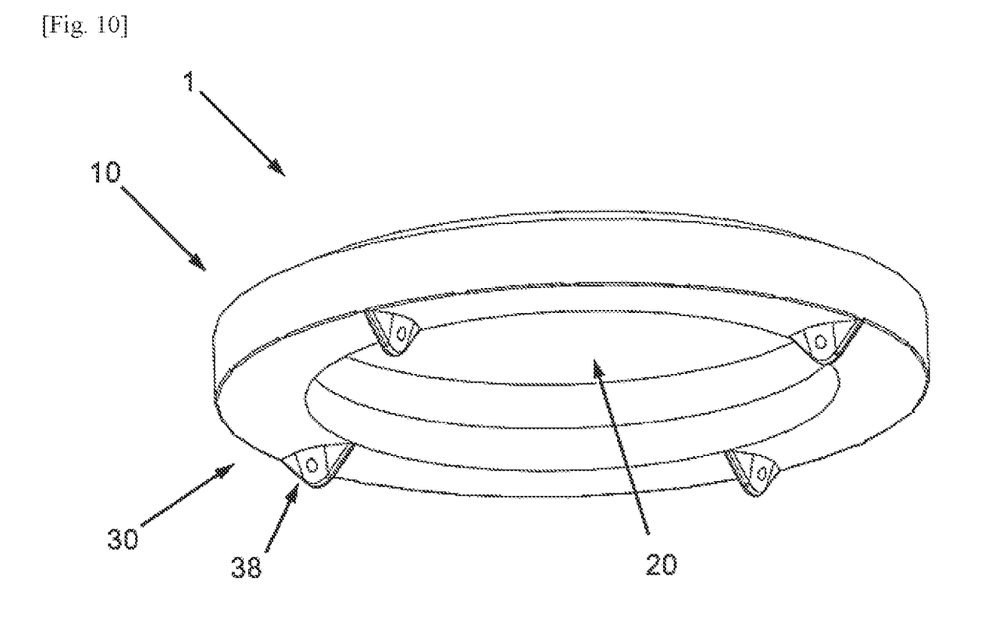
FIG. 10 is a perspective view of a protection system in accordance with a third embodiment of the invention.

Other embodiments of a protection system (1) in accordance with the invention are shown in FIGS. 9 to 10. Certain constituent elements are comparable to those of the first embodiment described above and, for the purposes of simplification, have the same reference numerals.

FIG. 9 shows a protection system (1) consisting of a single protective part (10). The centre of the hub (23) comprises an anchoring member (26) that is integral with the central portion (20). Two lines (51, 52) or straps may be fixed to the member (26), respectively above and below. A first line (51) rises through the pipe (2) in order to enable the protective part (10) to be recovered from the interior. If required, a second line (52) may be fixed under the protective part (10) for removal from the exterior.

FIG. 10 shows a protection system (1) consisting of a single protective part, the central portion (20) of which is completely recessed. The peripheral portion (30) comprises four attachment points (38) provided for fixing lines or straps. These lines rise via the pipe (2) in order to enable the part (10) to be recovered from the interior. Alternatively, the lines may remain on standby under the part (10) for removal by an underwater vehicle.

The part (10) is generally one-piece, such that the system (1) is mainly made from a single material.

Furthermore, the protection system (1) and the pipe (2) may be shaped differently from FIGS. 1 to 10 without moving away from the scope of the invention, which is defined by the claims. Furthermore, the technical characteristics of the various embodiments and variants mentioned above can be combined in their entirety or only in part. Thus, the system (1) can be adapted in terms of cost, functions and performance.

The invention claimed is:

1. A system for protecting the mouth of a pipe, the system comprising a protective part that has a peripheral portion and a wheel-shaped central portion comprising at least two radii and a central hub;
   wherein a radius of the at least two radii extends between the central hub and the peripheral portion and are separated by openings for the passage of a fluid circulating in the pipe, and
   wherein the peripheral portion is provided with skirts provided to protect surfaces of the mouth from the fluid, the protective part being made of a deformable material, so as to be able to be removed from the interior of the pipe.

2. The system according to claim 1, wherein the protective part has thinned areas in order to facilitate deformation and removal.

3. The system according to claim 1, wherein the radii have a cylindrical cross-section.

4. The system according to claim 1, wherein the radii are inclined relative to a radial plane of the protective part.

5. The system according to claim 1, wherein the peripheral portion is provided with at least three skirts in order to protect, respectively, an internal surface, a front surface and an external surface of the mouth of the pipe.

6. The system as claimed in claim 1, wherein the system comprises attaching means designed to attach tensile means to the protective part, so that it may be removed.

7. The system according to claim 6, wherein the attaching means are designed to attach tensile means to the protective part from above and below, so that it may be removed selectively from the interior or exterior of the pipe.

8. The system according to claim 1, wherein the protective part is made of a polyurethane material.

9. A method of implementing a protection system according to claim 1, wherein the method comprises a step for assembling the protective part onto the mouth of the pipe, and a step for removing the protective part selectively from the interior or exterior of the pipe.

* * * * *

UNITED STATES PATENT AND TRADEMARK OFFICE
CERTIFICATE OF CORRECTION

| | | |
|---|---|---|
| PATENT NO. | : 11,933,448 B2 | Page 1 of 1 |
| APPLICATION NO. | : 17/783006 | |
| DATED | : March 19, 2024 | |
| INVENTOR(S) | : Hervé Courbis | |

It is certified that error appears in the above-identified patent and that said Letters Patent is hereby corrected as shown below:

On the Title Page

Item (30) Foreign Application Priority Data:
"2000680" should be changed to --FR2000680--

Signed and Sealed this
Second Day of July, 2024

Katherine Kelly Vidal
*Director of the United States Patent and Trademark Office*